J. ERDIE.
DIRECTION SIGNAL.
APPLICATION FILED NOV. 3, 1917.
1,307,964.
Patented June 24, 1919.
2 SHEETS—SHEET 1.
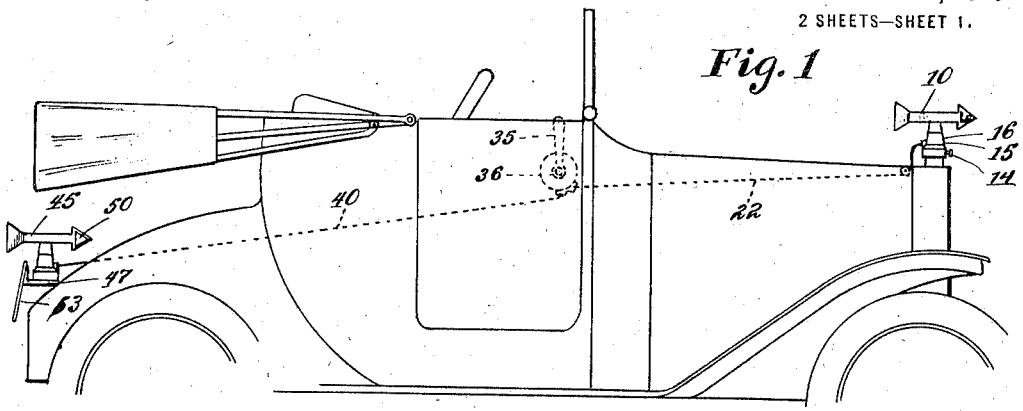
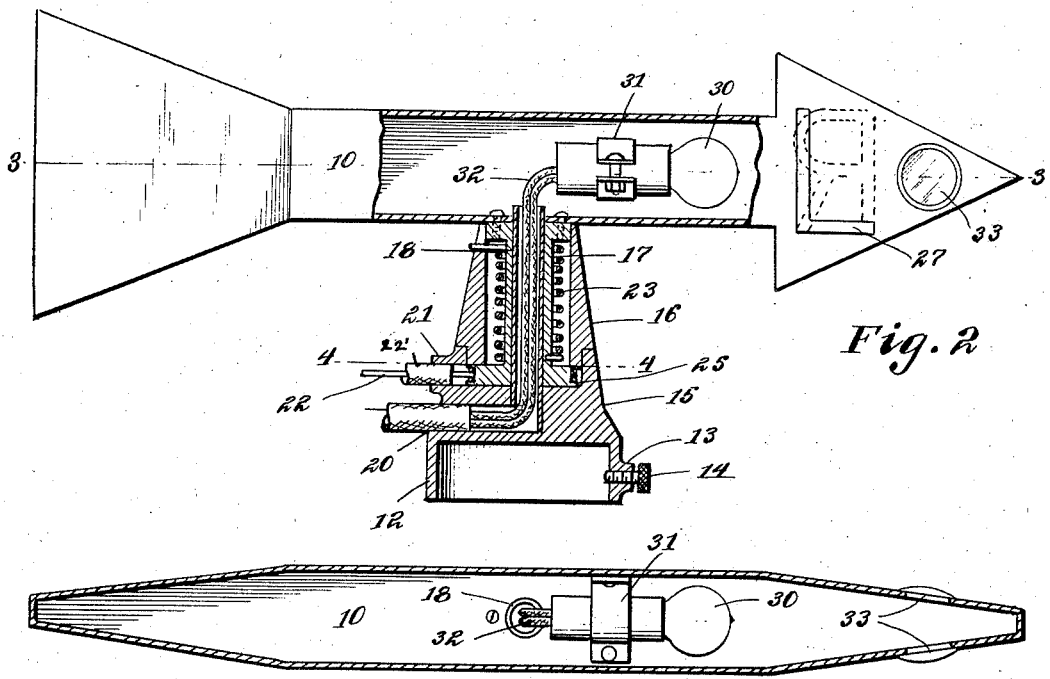
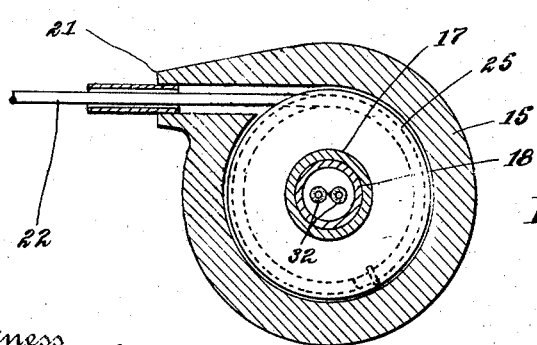
Witness
C. F. Rudolph
E. M. Springer
Inventor
John Erdie,
By 
Attorney J. ERDIE.
DIRECTION SIGNAL.
APPLICATION FILED NOV. 3, 1917.
1,307,964.
Patented June 24, 1919.
2 SHEETS—SHEET 2.
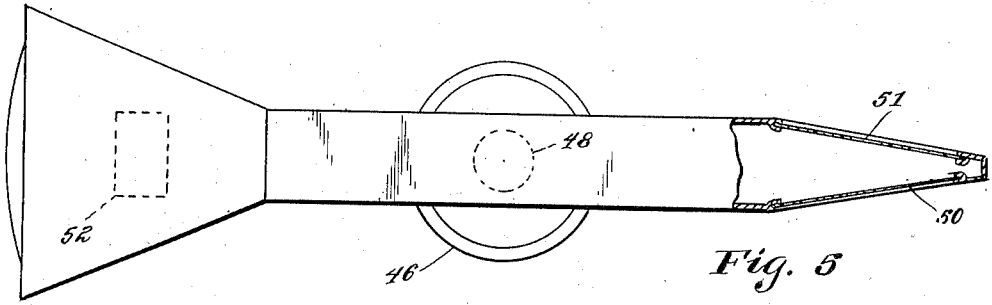
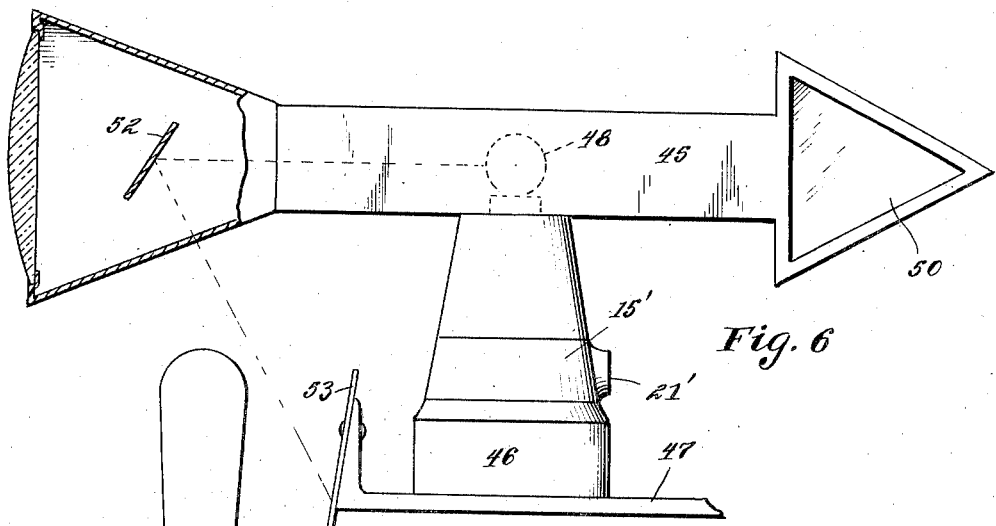
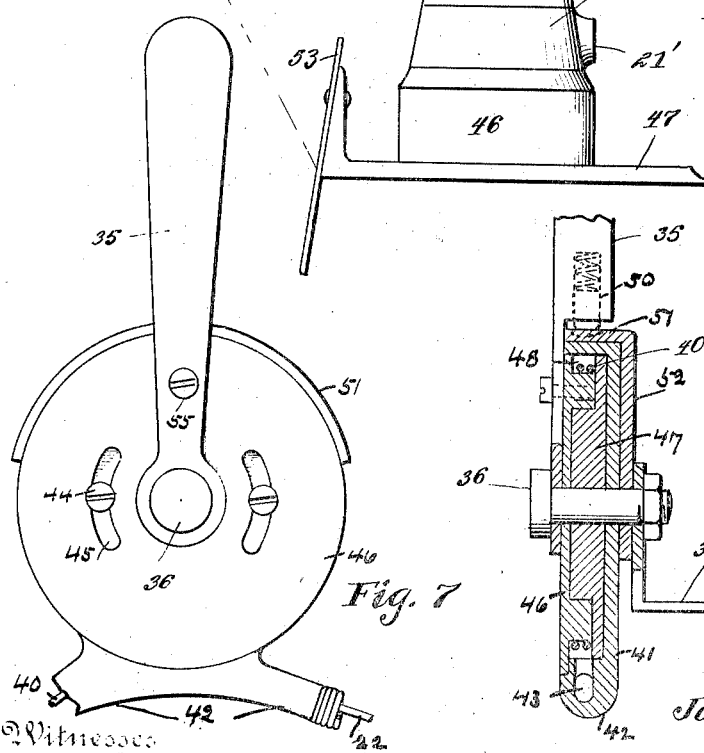
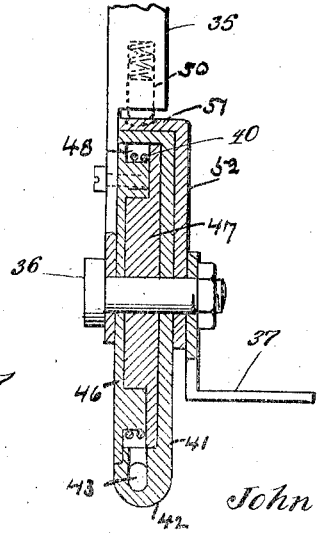
Inventor
John Erdie,
By Victor J. Evans
Attorney

UNITED STATES PATENT OFFICE.

JOHN ERDIE, OF TRENTON, NEW JERSEY.

DIRECTION-SIGNAL.

1,307,964.   Specification of Letters Patent.   Patented June 24, 1919.

Application filed November 3, 1917. Serial No. 200,115.

*To all whom it may concern:*

Be it known that I, JOHN ERDIE, a citizen of the United States, residing at Trenton, in the county of Mercer and State of New Jersey, have invented new and useful Improvements in Direction-Signals, of which the following is a specification.

This invention relates to a direction indicating device for vehicles, and the object is to provide improved means under the control of the operator of an automobile or the like for indicating the direction of intended travel, said means including a mechanically and electrically illuminated signal located at the front of the vehicle and a similar device located at the rear of the vehicle.

A further object is to provide in connection with a rotatably mounted arrow carrying designations indicating right and left, certain mechanical means of novel construction for controlling the arrow, and electrically operated means for illuminating the arrow and designations carried thereby, when such illumination is required.

A still further object is to provide for the operation of a rear or tail signal simultaneously with the operation of the signal above mentioned, located at the front of the vehicle.

With the foregoing and other objects in view, the invention consists in the novel construction, combination and arrangement of elements hereinafter described and claimed.

In the accompanying drawings:

Figure 1 is a view showing conventionally a portion of an automobile with the front and rear direction arrows properly mounted, and operating means therefor.

Fig. 2 shows the front arrow partly in elevation and partly in vertical section, and the mounting means therefor.

Fig. 3 is a longitudinal section on the line 3—3 of Fig. 2.

Fig. 4 is a horizontal section on line 4—4 of Fig. 2.

Fig. 5 is a plan view of the rear arrow with portions broken away.

Fig. 6 is an elevation of the same arrow with portions broken away, and showing the mounting means.

Fig. 7 is a plan view of the operating device controlled from a point near the dash board.

Fig. 8 is a transverse section through the construction shown in Fig. 7.

The indicating device located at the front of the vehicle comprises an arrow pivotally mounted and adapted for location on a base, with means within reach of the operator of the car for rotating the arrow to a position indicating right and left, and means operated from the same point and at the same time for controlling the signal at the rear of the vehicle.

The arrow at the front of the car is designated 10 and is carried upon a suitable supported device including a base portion 12 which may be secured above the radiator, and if desired to the inlet member for filling said radiator. The base portion 10 is provided with a threaded boss 13 accommodating a thumb screw 14 for securing the base portion 12 in position.

Carried upon said base portion is a casing comprising a plurality of members 15 and 16 serving to house a rotatable member 17 which may have the form of a spool and which is provided with a bore accommodating a central tube 18 constituting a duct through which the electric wires pass, these wires entering through the opening 20. Portion 15 is provided with an offset member 21 accommodating a wire or flexible device 22, this element last named leading to a point within reach of the operator and being controlled by a device described below.

The rotatable member 17 is retained in a given position by means of a coiled spring 23 having its ends properly secured so that when said rotatable member is actuated it will be returned to normal position by the action of the spring. Connecting member 22 passes into the interior of the casing and engages the lower flanged portion 25 of member 17 for rotating the latter.

The arrow 10 is provided with indicating members for conveying information to an operator of another car regarding the direction of intended travel. The letter L shown at 27 appears on one side of the forward portion of arrow 10 and the letter R on the other side thereof, indicating left and right respectively. These letters are illuminated at night by means of an electric lamp 30 mounted within any suitable securing devices 31 and having connection with wires 32 for supplying current to the lamp. The forward portion of the arrow carries small red lights designated 33. The arrow is operated mechanically by means of a handle 35 pivotally mounted at 36 on a bracket 37 secured in a suitable position.

An outer casing 41 is provided with a central aperture through which the pivot or pin 36 passes, this casing having an extension or extensions 42 provided with a bore 43 through which the wires 22 and 40 lead to the front and rear arrows. The flanged disk 46 coöperates with disk 47 and forms a channel 48 for the wires leading to the arrows. These wires pass through flexible devices 22' on the mounting means for said arrows. One wire is secured to each disk 46 or 47, and the disks are secured together and are adjustable with reference to each other by means of screws 44 passing through slots 45. The heads of the screws rigidly engage the disk 46 when adjustment is made.

The handle 35 carries a spring pressed pin 50 engaging recesses in the flange 51 of a stationary segmental member 52, the latter having an aperture through which the pin 36 passes. Handle 35 is movable on pin 36 and is secured to disk 46 by means of a screw 55, and both disks 46 and 47 are rotated at one time, and the wires extending in opposite directions therefrom are simultaneously operated for moving the front and rear arrows.

The rear signal includes a rotatably mounted arrow designated 45, the mounting means being substantially the same as those above described in connection with the arrow 10 at the front of the car. The mounting means for the rear arrow however, may be provided with a flat base portion 46 mounted upon a supporting member 47. The member 15' of the supporting device for the arrow is provided with an offset portion 21' through which the connecting devices extending to the operating member on the dash board is conducted.

The rear arrow 45 is provided with an electric lamp 48 illuminating a lens of red glass at the rear and illuminating plates of green and blue glass 50 and 51 at the front. A plate of glass 52 throws a light downwardly across the license plate 53.

It will be understood that the arrows are each made in the form of a casing within which the electric lamps are located.

What is claimed is:—

1. In a device of the class described, a rotatably mounted arrow carrying designations indicating right and left, means for illuminating said designations, mechanical means for rotating the arrow and comprising a resiliently mounted rotatable member adapted to return the arrow to normal position when operated, a casing comprising a tubular member receiving the resiliently mounted rotatable member, said casing including a base portion and means connected therewith for securing the base portion and the rotatable means in position.

2. In a device of the class described, a rotatably mounted arrow carrying designations indicating direction, mounting means for the arrow including a rotatably mounted and spring controlled spool provided with a grooved flanged portion, means operable from the dashboard of a vehicle for controlling the rotary means and including a flexible device engaging the grooved flange, a base portion upon which the spool is mounted, and means for securing the base to an element of the vehicle, said base having a bore through which the flexible device passes.

In testimony whereof I affix my signature.

JOHN ERDIE.